United States Patent [19]

Murakami et al.

[11] Patent Number: 4,746,346
[45] Date of Patent: May 24, 1988

[54] METHOD FOR PRODUCING AIR-TIGHT, HEAT-RESISTANT PLATE

[75] Inventors: Tadaki Murakami; Kiyoshi Takata; Kazuharu Kato; Kazuo Okahashi, all of Amagasaki; Hitoshi Yamazaki; Takao Takeda, both of Kamakura, all of Japan

[73] Assignee: Mitsubishi Denki Kabushiki Kaisha, Tokyo, Japan

[21] Appl. No.: 7,094

[22] Filed: Jan. 27, 1987

[30] Foreign Application Priority Data

Jan. 27, 1986 [JP] Japan ................... 61-15517

[51] Int. Cl.⁴ ............................................. C03C 27/00
[52] U.S. Cl. ............................... 65/43; 65/59.21; 65/59.22; 65/59.5
[58] Field of Search ............... 65/43, 59.21, 59.22, 65/59.5

[56] References Cited

U.S. PATENT DOCUMENTS

| | | | |
|---|---|---|---|
| 2,912,340 | 11/1959 | Pincus | 65/59.22 X |
| 3,051,589 | 8/1962 | Sanford et al. | 65/59.5 X |
| 3,228,548 | 1/1966 | Butler | 65/43 X |
| 3,374,076 | 3/1968 | Smith | 65/59.5 X |
| 3,881,904 | 5/1975 | Stokes et al. | 65/43 |
| 4,002,799 | 1/1977 | Dumesnil et al. | 65/43 X |
| 4,585,972 | 4/1986 | Hing | 65/43 X |

FOREIGN PATENT DOCUMENTS

| | | | |
|---|---|---|---|
| 146913 | 3/1949 | Australia | 65/43 |
| 53-141915 | 12/1978 | Japan | 65/59.21 |

Primary Examiner—Robert L. Lindsay
Attorney, Agent, or Firm—Oblon, Fisher, Spivak, McClelland & Maier

[57] ABSTRACT

A method for producing an air-tight, heat-resistant plate for a particular use in manufacturing bulbous fluorescent lamp, which comprises: preparing a shaping material by mixing an inorganic filler composed of alumina powder and silica powder in a specified compositional ratio, and glass powder having a thermal expansion coefficient of 8.5 to $11.5 \times 10^{-6}$/°C., both inorganic filler and glass material being blended at a predetermined ratio then, forming the shaping material into a shaped product of any desired configuration by a known shaping method; thereafter heating this shaped body to a temperature, at which the glass powder used becomes molten and fused, thereby rendering it to be a burned body.

3 Claims, 1 Drawing Sheet

METHOD FOR PRODUCING AIR-TIGHT, HEAT-RESISTANT PLATE

BACKGROUND OF THE INVENTION

1. Field of the Invention

This invention relates to a method for production of an air-tight, heat-resistant plate suitable for use in manufacturing bulbous fluorescent lamps, in particular. More specifically, it is concerned with provision of air-tight, heat-resistant plate for fixedly securing, with good air-tightness, in the production of the above-mentioned bulbous fluorescent lamps, stems for holding thereon the electrodes, a fluorescent inner tube (a tube coated on its inner surface with a layer of light emitting substance), or an outer glass tube for protecting the fluorescent inner tube, a gas discharge tube, and so forth.

2. Discussion of Background

The following are the major characteristics required, in general, of such air-tight, heat-resistant plate:

(i) its thermal expansion coefficient is coincident with that of the fluorescent inner tube, the gas discharge tube or the outer glass tube, which is approximately 9.0 to $10.5 \times 10^{-6}/°$ C. (an average thermal expansion coefficient at a temperature range of from 25° C. to 500° C.);

(ii) it maintains such high air-tightness that does not permit leakage of a gas sealed therein;

(iii) it has excellent adhesiveness and air-tightness with a low melting point glass for sealing; and (vi) it is durable against usual sealing temperature of from 400° C. to 500° C.

In recent years, fluorescent lamps have taken a variety of forms, and, as one of such forms, bulbous fluorescent lamps of different designs have been developed.

FIG. 1 of the accompanying drawing shows one example of such bulbous fluorescent lamp, in which the fluorescent inner tube 2, the outer glass tube 3, the stems 4 for holding the electrodes, the gas discharge tube 5, and so on are assembled on a single sheet of the air-tight, heat-resistant plate 1 and sealed with a low melting point glass 6.

The material which consists essentially of an inorganic filler and glass powder (i.e., a glass-ceramic type material), and which is usually used for the production of such air-tight, heat-resistant plate has been well recognized among those in this field of technology owing to its advantageously low cost, its excellent shapability into product of various configurations, and other characteristics. In spite of such remarkable characteristics, however, there has so far been found no air-tight, heat-resistant plate which meets all the requirements of the thermal expansion coefficient, air-tightness, electric insulation, heat-resistance, and other properties for particular use in the manufacture of the above-mentioned bulbous fluorescent lamps.

In view of such situation, there has been strong demand for emergence of the glass-ceramic type material satisfying all the characteristic requirements as mentioned above adapted for the production of the air-tight, heat-resistant plate for the bulbous fluorescent lamps.

SUMMARY OF THE INVENTION

With a view to improving the physical properties of the glass-ceramic type material for use in the production of the air-tight, heat-resistant plate for use in the production of the fluorescent lamps, the present inventor has found out that use of a shaping material composed of alumina powder and silica powder as the inorganic fillers, and glass powder having a particular thermal expansion coefficient at a particular compositional ratio is very effective for attaining the purpose.

That is to say, according to the present invention, in general aspect of it, there is provided a method for producing an air-tight, heat-resistant plate which comprises steps of: preparing a shaping material by mixing 25 to 45% by weight of an inorganic filler composed of 100 parts by weight of alumina powder and 15 to 50 parts by weight of silica powder, and 55 to 75% by weight of glass powder having a glass transition point of 500° C. or above and a thermal expansion coefficient of from 8.5 to $10^{-6}/°$ C. to $11.5 \times 10^{-6}/°$ C.; forming said shaping material into a desired shaped body by an ordinary forming method; and heating to burn said shaped body at a temperature, at which said glass powder becomes molten and fused, thereby obtaining a burned body.

The foregoing object, other objects as well as the specific process steps for its production will become more apparent and understandable from the following detailed description thereof, when read in conjunction with the accompanying drawing.

BRIEF DESCRIPTION OF THE ACCOMPANYING DRAWING

In the drawing, the single FIG. 1 is a general conceptual diagram showing a bulbous fluorescent lamp, in which the air-tight, heat-resistant plate according to the present invention is used.

DETAILED DESCRIPTION OF PREFERRED EMBODIMENTS

Figure 1:
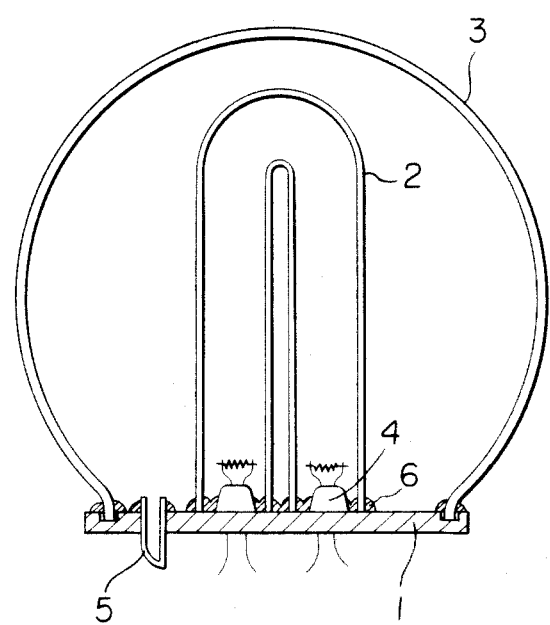

In the following, the present invention will be described in specific details with reference to several preferred examples thereof.

The reason for employing alumina powder ($\alpha$-31 $Al_2O_3$) for the purpose of the present invention is that the substance serves to increase the heat-resistance and the mechanical strength such as bending strength of the shaped product. Also, silica powder (quartz powder) has the effect of increasing the heat-resistant property, same as the alumina powder, and affinity of the plate with the low melting point glass for sealing, and has a relatively large thermal expansion coefficient (13 to 15 $\times 10^{-6}/°$ C.), on account of which it can afford particular advantage in matching with the thermal expansion coefficient of the air-tight, heat-resistant plate.

The reason for limiting the compositional ratio of the alumina powder and the silica powder to 15 to 50 parts by weight of silica powder relative to 100 parts by weight of alumina powder is that, with the silica powder not reaching 15 parts by weight, no effect of its addition comes out with the consequent decrease in the affinity of the air-tight, heat-resistant plate with the low melting point glass for sealing, in particular, which tends to bring about problem in the air-tightness at the time of sealing; on the contrary, with the silica powder exceeding 50 parts by weight, the inorganic filler has its composition of a reduced ratio of the alumina powder with the consequence that the mechanical strength such as, for example, bending strength of the shaped product becomes inferior. The average particle size of both alumina powder and silica powder to be used should preferably be 10 $\mu$m or below, and, when it exceeds 10 $\mu$m, the product becomes poor in its surface smoothness.

The glass powder to be used should have its high electric insulation, its glass transition temperature of 500° C. or above, and its average thermal expansion coefficient of from $8.5 \times 10^{-6}/°$ C. to $11.5 \times 10^{-6}/°$ C. at a temperature range of from 25° C. (normal temperature) to 500 °C. The reason for setting the glass transition temperature at 500° C. or above is that the working temperature at the time of sealing the low melting point glass ranges in general from 400° C. to 500° C., at which neither thermal deformation nor abnormal expansion should take place in the air-tight, heat-resistant plate. In general, glass material does not present thermal deformation or abnormal expansion at a temperature below its glass transition point.

The reason for setting the average thermal expansion coefficient in a range of from $8.5 \times 10^{-6}/°$ C. to $11.5 \times 10^{-6}/°$ C. at a temperature ranging from 25° C. (normal temperature) to 500° C. is that, with its being under $8.5 \times 10^{-6}/°$ C., it is difficult to satisfy the above-mentioned range of the thermal expansion coefficient of 9.0 to $10.5 \times 10^{-6}/°$ C. required of the air-tight, heat-resistant plate. The same thing can be said of a case when the thermal expansion coefficient exceeds $11.5 \times 10^{-6}/°$ C.

Incidentally, the particle size of the glass powder to be used should preferably be 10 μm or below, and, when it exceeds 10 μm, the surface flatness, air-tightness, etc. of the product would unfavorably be spoiled.

In the next place, the air-tight, heat-resistant plate to be used in the present invention should desirably be white-colored, in general. As the coloring matter, therefore, it is preferable that titanium oxide, zinc oxide, etc. in powder form be added to the shaping material at a ratio of less than 5 parts by weight of the coloring matter relative to 100 parts by weight of the shaping material. While it is, of course, possible that the shaping material is colored in white with the quantity of the coloring matter exceeding 5 parts by weight, such excessive amount of the coloring matter would apprehensively cause reduction in the bending strength, and decrease in the thermal expansion coefficient, hence such a quantity more than required is not preferable. By the way, the air-tight, heat-resistant plate according to the present invention primarily assumes white in color even without addition of the above-mentioned coloring matter, hence no practical inconvenience arises from such non-addition, although the coloring matter is useful in case whiteness of the shaped product should be increased and light-reflectivity be improved.

By the use of the shaping material consisting essentially of the inorganic filler composed of alumina powder and silica powder at their particular compositional ratio, and a glass powder having the thermal expansion coefficient of 8.5 to $11.5 \times 10^{-6}/°$ C., both ingredients being mixed at a predetermined ratio, the air-tight, heat-resistant plate according to the present invention exhibits its optimum thermal expansion coefficient in the above-mentioned particular use, hence it is capable of solving the above-mentioned various problems.

With a view to enabling those persons skilled in the art to readily put this invention into practice, the following preferred examples thereof will be presented.

EXAMPLE 1

On one hand, as the inorganic filler, use was made of 30 parts by weight of alumina powder (a product of Nippon Kenmazai Kogyo K.K., $\alpha$-$Al_2O_3$, having an average particle size of 8 μm) and 4.5 parts by weight of silica powder (a product of Ishizu Seiyaku K.K., quartz powder, having an average particle size of 6 μm). On the other hand, as the glass powder, use was made of 65.5 parts by weight of glass having its thermal expansion coefficient of $10.8 \times 10^{-6}/°$ C. (at 25° C. to 500° C.) and its glass transition point of 520 °C. (a product of Nippon Fellow K.K., having an average particle size of 7 μm). These specific ingredients were blended in a ball mill for 8 to 10 hours to thereby obtain the shaping material.

To 100 g of the thus obtained shaping material, 10 cc of 5% aqueous solution of methyl cellulose was added and well mixed, and the resulting mixture was charged in a metal mold of 110 mm in diameter and 30 mm in height, and then it was kept in the mold for 1 min. under a pressure of 200 kg/cm$^2$.

Subsequently, the shaped article was removed from the mold, and dried for three hours at a temperature ranging from 60° C. to 80° C., after which it was placed in an electric furnace at an ambient temperature of 50° C. or below, followed by heating it to 670° C. at a rate of temperature rise of 5° C./min.. At that elevated temperature, the shaped body was kept for 1 hour, and then it was allowed to cool gradually to 200° C. or below. Following this, it was taken out of the furnace to be processed into an air-tight, heat-resistant plate of 5.6 mm in thickness and 95 mm in diameter. Table 1 below indicates the measured results of the plate thus produced.

It should be noted that, in Table 1 below, the bending strength is shown in terms of a value found by the three-point bending test (a distance among the points being 50 mm) with a test piece obtained by cutting the planar product to a dimension of 5.6 mm in thickness, 10 mm in width, and 60 mm in length; the thermal expansion coefficient is denoted in terms of a value found from the test piece having a dimension of 5.6 mm in thickness, 5 mm in width and 50 mm in length which is an average thermal expansion coefficient (at 25° C. to 500° C.) obtained by heating it at a rate of the temperature rise of 3° C./min.; and the air-tightness is indicated in terms of a value found by its helium gas permeability, for the purpose of which use was made of a test piece of 5.6 mm in thickness, 35 mm in width, and 35 mm in length, and a helium detector.

EXAMPLE 2

The same procedures as in Example 1 above were followed with the exception that 20 parts by weight of alumina powder and 5 parts by weight of silica powder in Example 1 above were used as the inorganic filler, and 75 parts by weight of glass powder in Example 1 was used, thereby obtaining the air-tight, heat-resistant plate. This plate was also subjected to measurement in the same manner as in Example 1 to obtain thereby the results as shown in Table 1 below.

EXAMPLE 3

The same procedures as in Example 1 above were followed, with the exception that 30 parts by weight of alumina powder and 15 parts by weight of silica powder in Example 1 were used as the inorganic filler, and 55 parts by weight of glass powder in Example 1 was used, thereby obtaining the air-tight, heat-resistant plate. The thus produced plate was subjected to measurement of its characteristics as in Example 1 above to obtain the results as shown in Table 1 below.

EXAMPLE 4

Pursuant to Example 3 above, 5 parts by weight of titanium oxide powder as the coloring matter (a product of Ishizu Seiyaku K.K., having an average particle size of 3 μm) was added to 100 parts by weight of the shaping material composed principally of glass powder having a thermal expansion coefficient of $8.5 \times 10^{-6}/°$ C. (at a temperature range of from 25° C. to 500° C.) and a glass transition point of 550° C. (commercially available in the general market, and having an average particle diameter of 8 μm), which was obtained by crushing plate glass. Then, these ingredients were mixed in a ball mill for three hours. To 100 g of the thus obtained shaping material, there was admixed 10 cc of 5% aqueous solution of methyl cellulose, with which the shaped body was manufactured in the same manner as in Example 1 above. After drying the shaped article for three hours at 60° C. to 80° C., it was placed in an electric furnace at an ambient temperature of 50° C. or below, and then it was heated to 650° C. at a rate of temperature rise of 5° C./min., at which temperature the shaped article was held for one hour. Thereafter, the thus heated shaped body was gradually cooled to 200° C. or below, and then taken out of the electric furnace, from which the air-tight, heat-resistant plate of a thickness of 5.6 mm and a diameter of 94.8 mm was obtained. The characteristics of this shaped body was measured in the same manner as in Example 1 above, with the results as shown in Table 1 below.

EXAMPLE 5

On one hand, as the inorganic filler, use was made of 28 parts by weight of alumina powder and 7 parts by weight of silica powder as in Example 1. On the other hand, as the glass powder, use was made of 65 parts by weight of glass material having a thermal expansion coefficient of $11.5 \times 10^{-6}/°$ C. (at 25° C. to 500° C.) and a glass transition point of 505° C. (a product of Japan Fellow K.K., having an average particle size of 9 μm). These ingredients were mixed in a ball mill for 8 to 10 hours to thereby obtain the shaping material. To 100 parts by weight of the thus obtained shaping material, there was added 5 parts by weight of zinc oxide powder (a product of Sakai Kagaku K.K., having an average particle size of 0.8 μm), and tnen tney were mixed for 3 hours in a ball mill. To 100 g of the thus obtained shaping material, there was admixed 10 cc of 5% aqueous solution of methyl cellulose, with which a shaped body was manufactured in the same procedures as in example 1 above. Thus, the shaped body was dried at a temperature of from 60° C. to 80° C. for 3 hours, after which it was placed in an electric furnace at an ambient temperature of 50° C. or below, followed by heating it to a temperature of 650° C. at a rate of temperature rise of 5° C./min. At this elevated temperature, the shaped body was kept for 1 hour, followed by its gradual cooling to 200° C. or below, then the shaped product was taken out of the furnace to be processed into the air-tight, heat-resistant plate of 5.6 mm in thickness and 94.8 mm in diameter. Following this, the characteristics of the plate were measured in the same manner as in Example 1 above, the results of which are shown in Table 1 below.

COMPARATIVE EXAMPLE 1

The same procedures as in Example 1 above were followed, with the exception that 40 parts by weight of alumina powder and 10 parts by weight of silica powder in Example 1 above were used as the inorganic filler and 50 parts by weight of the glass powder in Example 1 was used as the glass material, with which a comparative test specimen was produced. The results of measurement of its characteristics are as shown in Table 1 below.

COMPARATIVE EXAMPLE 2

The same procedures as in Example 1 were followed with the exception that 40 parts by weight of alumina powder in Example 1 above was used as the inorganic filler, and 60 parts by weight of glass powder in Example 1 above was used as the glass material, with which a comparative test specimen was produced. The results of measurement of its characteristics are as shown in Table 1 below.

COMPARATIVE EXAMPLE 3

The same procedures as in Example 1 above were followed with the exception that 15 parts by weight of alumina powder and 5 parts by weight of silica powder in Example 1 were used as the inorganic filler, and 80 parts by weight of glass powder in Example 1 was used as the glass material, with which a comparative test specimen was produced. The results of measurement of its characteristics are as shown in Table 1 below.

TABLE 1

| Exs. and Comparative Exs. | Materials and Compositional Ratio (wt. %) | | | | | Quantity of Silica Powder to 100 wt. Part of Alumina Powder (wt. part) | Blending Ratio of Inorganic Filler/Glass Powder |
|---|---|---|---|---|---|---|---|
| | Inorganic Filler | | Glass Powder | Coloring Matter | | | |
| | Alumina Powder | Silica Powder | | Titanium Oxide | Zinc Oxide | | |
| Ex. 1 | 30 | 4.5 | 65.5 | — | — | 15 | 34.5/65.5 |
| Ex. 2 | 20 | 5 | 75.0 | — | — | 25 | 25/75 |
| Ex. 3 | 30 | 15 | 55.0 | — | — | 50 | 45/55 |
| Ex. 4 | 30 | 15 | 55.0 | 5.0 | — | 50 | 45/55 |
| Ex. 5 | 28 | 7 | 65.0 | — | 5.0 | 25 | 35/65 |
| Comp. Ex. 1 | 40 | 10 | 50 | — | — | 25 | 50/50 |
| Comp. Ex. 2 | 40 | — | 60 | — | — | 0 | 40/60 |
| Comp. Ex. 3 | 15 | 5 | 80 | — | — | 33.3 | 20/80 |

| Exs. and Comparative Exs. | Characteristics of Glass Powder | | Characteristics | | |
|---|---|---|---|---|---|
| | Glass Transition Point (°C.) | Thermal Expansion Coefficient (25–500° C.) $[\times 10^{-6}/°C.]$ | Bending Strength (kg/cm$^2$) | Thermal Expansion Coefficient (25–500° C.) $[\times 10^{-6}/°C.]$ | Air-Tightness (Quantity of Helium Leakage) (atm, cc/sec.) |
| Ex. 1 | 520 | 10.8 | 850 | 10.0 | $< 1 \times 10^{-11}$ |

TABLE 1-continued

| | | | | | |
|---|---|---|---|---|---|
| Ex. 2 | 520 | 10.8 | 720 | 10.2 | $<1 \times 10^{-11}$ |
| Ex. 3 | 520 | 10.8 | 900 | 9.8 | $<1 \times 10^{-11}$ |
| Ex. 4 | 550 | 8.5 | 950 | 9.2 | $<1 \times 10^{-11}$ |
| Ex. 5 | 505 | 11.5 | 830 | 10.4 | $<1 \times 10^{-11}$ |
| Comp. Ex. 1 | 520 | 10.8 | 920 | 8.7 | $<1 \times 10^{-9}$ |
| Comp. Ex. 2 | 520 | 10.8 | 980 | 7.8 | $<1 \times 10^{-11}$ |
| Comp. Ex. 3 | 520 | 10.8 | 470 | 10.5 | $<1 \times 10^{-11}$ |

In the foregoing, the present invention has been described with particular reference to several preferred examples thereof. It should, however, be understood that the present invention is not limited to these examples alone, but any changes and modifications may be made within the spirit and scope of the invention as recited in the appended claims.

What is claimed is:

1. A method for producing an air-tight, heat-resistant plate which comprises steps of:
   (a) preparing a shaping material by mixing 25 to 45% by weight of an inorganic filler consisting essentially of 100 parts by weight of alumina powder and 15 to 50 parts by weight of silica powder; and 55 to 75% by weight of glass powder having a glass transition point of 500° C. or above and a thermal expansion coefficient of from $8.5 \times 10^{-6}$/° C. to $11.5 \times 10^{-6}$/° C.;
   (b) forming said shaping material into a shaped body of a desired configuration by an ordinary forming method; and
   (c) heating to burn said shaped body at a temperature, at which said glass powder becomes molten and fused, thereby obtaining a burned body.

2. The method for producing an air-tight, heat-resistant plate according to claim 1, wherein a coloring matter selected from the group consisting of titanium oxide and zinc oxide in powder form is added in a quantity of not more than 5 parts by weight relative to 100 parts by weight of said shaping material.

3. The method for producing an air-tight, heat-resistant plate according to claim 1, wherein each of the alumina powder, silica powder and glass powder has an average particle size of 10 μm or below.

* * * * *